United States Patent [19]
Shahir et al.

[11] 3,797,263
[45] Mar. 19, 1974

[54] DEWAR FILLING, PURGING, AND DRAINING SYSTEM

[75] Inventors: Fred A. Shahir, Santa Ana; William R. Clarke, Los Angeles, both of Calif.

[73] Assignee: Parker-Hannifin Corporation, Cleveland, Ohio

[22] Filed: Jan. 7, 1972

[21] Appl. No.: 216,112

[52] U.S. Cl. ................................ 62/51, 62/55, 137/102
[51] Int. Cl. ................................................. F17c 7/02
[58] Field of Search .......... 220/88 B; 62/55, 50, 51; 137/102

[56] References Cited
UNITED STATES PATENTS

| | | | |
|---|---|---|---|
| 2,515,835 | 7/1950 | Preston | 62/50 X |
| 2,964,916 | 12/1960 | Keeping | 62/55 X |
| 2,059,005 | 10/1936 | Lane | 220/88 B |
| 2,850,882 | 9/1958 | Starnes | 62/55 X |
| 3,583,779 | 6/1971 | Olson et al. | 137/103 |

Primary Examiner—Meyer Perlin
Assistant Examiner—Ronald C. Capossela
Attorney, Agent, or Firm—Donnelly, Maky, Renner & Otto

[57] ABSTRACT

A dewar filling, purging, and draining system characterized in that in the case of servicing of an aircraft dewar containing inerting fluid in liquid form, such as liquid nitrogen ($LN_2$), for use in the aircraft for inerting fuel tanks and the like to prevent fire and explosion, the system is embodied in a mobile vehicle such as a pickup truck with the muffler thereof constituting a heat exchanger to control the saturation pressure of the liquid supplied from the system to the aircraft dewar and to heat gaseous nitrogen ($GN_2$) vented from the system so that no vapor clouds will be visible. The system herein is further characterized in that a single fill hose is employed through which all filling and venting is accomplished, the system and aircraft dewar being provided with pressure switches and the aircraft dewar being provided with liquid level sensors to automatically control the filling and venting functions of the system through electronic controls and valving contained in the system.

27 Claims, 2 Drawing Figures

3,797,263

DEWAR FILLING, PURGING, AND DRAINING SYSTEM

BACKGROUND OF THE INVENTION

At the present time aircraft are being equipped with inerting systems for fire and explosion prevention and for fire extinguishment which comprise dewars in the aircraft containing $LN_2$ or like inerting liquid for release into fuel tanks or other spaces which may contain combustible or explosive liquids or vapors. It is also known to mix nitrogen with incoming fuel during refueling of the aircraft thus to inert the fuel. Accordingly, there is presented the problem of periodic refilling of the aircraft dewars.

In known transfer equipment $LN_2$ is transferred from a supply dewar to a vented aircraft dewar thus resulting in substantial loss of liquid by evaporation and overflow, and furthermore such venting of cold $GN_2$ results in hugh vapor clouds which cause unnecessary alarm to airport personnel and passengers who may view such cloud formation without realization of the lack of danger involved.

Ventless and overflowless filling of aircraft dewars is disclosed in the copending application of Kimmel et al. Ser. No. 819,681, filed Apr. 28, 1969 now U.S. Pat. No. 3,633,372, and hence evaporation loss and overflow loss is substantially eliminated as is the problem of vapor cloud formation. However, venting of the aircraft dewar is desirable initially when the residual $LN_2$ in the aircraft dewar has a relatively high saturation pressure and when the filling operation is initiated because the entering $LN_2$ may be vaporized by residual heat in the transfer unit piping and in the aircraft dewar instead of conducting initial excess vapor pressure back to the ground supply dewar as is contemplated in said U.S. Pat. No. 3,633,372.

Although the system of U.S. Pat. No. 3,633,372 may minimize cloud formation by ventless and overflowless filling of aircraft dewars, the system therein makes no provision for draining of the aircraft dewar through the filling system, nor for purging the aircraft system with hot $GN_2$.

SUMMARY OF THE INVENTION

In contradistinction to the foregoing, the present system effects filling of an aircraft dewar with $LN_2$ from a supply dewar of the system by alternate $LN_2$ filling of the aircraft dewar and $GN_2$ venting therefrom to control the saturation pressure during the aircraft dewar filling operation, the vented $GN_2$ passing through a heat exchanger in the system effective to heat the $GN_2$ to a temperature exceeding the ambient dew point temperature so as to avoid vapor cloud formation.

It is another object of this invention to provide a system as aforesaid which makes provision for depressurizing and draining the fill hose thereof after the liquid transfer operation has been completed by the filling of the aircraft dewar with $LN_2$, the system additionally being provided with a drain hose for emptying the aircraft dewar and purging it or the associated aircraft fuel tanks with $GN_2$.

It is another object of this invention to provide a system which is embodied on a mobile unit which provides a self-contained complete system having all of the electric power and heat generating equipment in addition to the necessary $LN_2$ storage and flow controls.

It is yet another object of this invention to provide a system which includes safety interlocks between the ground supply unit and the aircraft to prevent the unit from being moved with respect to the aircraft while the unit is physically connected to the aircraft to perform filling, draining or purging operations as aforesaid.

Other objects and advantages of the present invention will appear hereinafter.

DETAILED DESCRIPTION OF THE DRAWING

Figure 1:
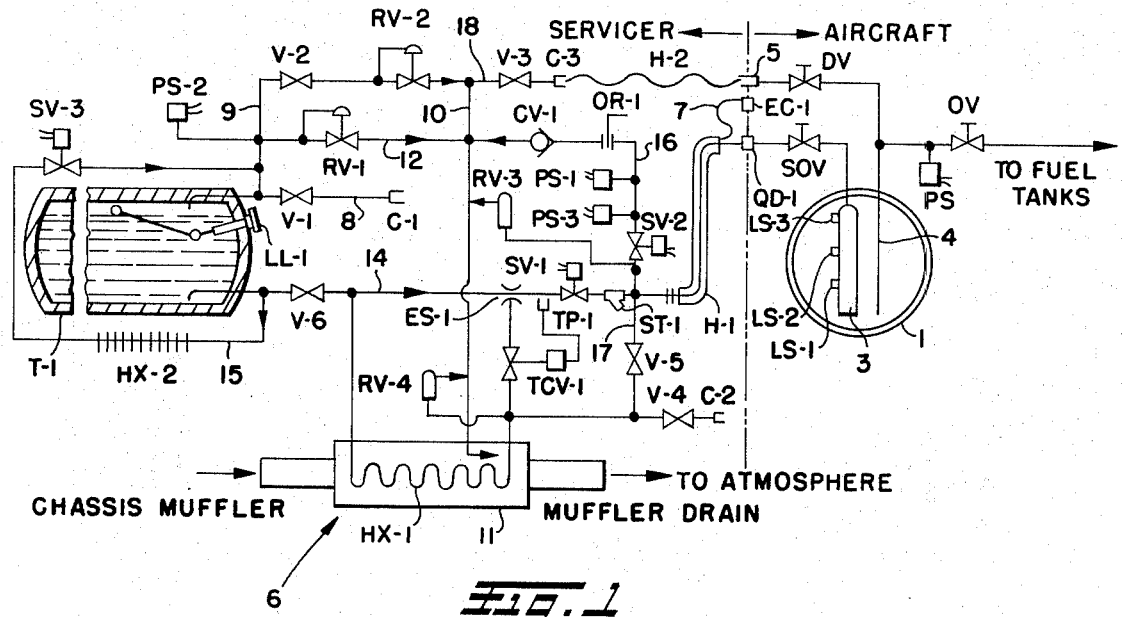
FIG. 1 is a schematic diagram of the system constituting the present invention which is adapted to be embodied as on a pickup truck to render the system mobile for travel to and from the aircraft for servicing the aircraft dewar which is shown schematically at the right-hand end of FIG. 1.

Referring first to FIG. 1, the aircraft dewar 1 has a fill line 2 with a shutoff valve SOV therein terminating in a quick disconnect coupling QD-1 at one end and a perforated fill tube 3 disposed within the aircraft dewar 1. The aircraft dewar 1 has therein an outlet tube 4 open near the bottom of the aircraft dewar, said outlet tube 4 having therein a pressure switch PS, an outlet valve OV through which $LN_2$ is conducted to the aircraft fuel tanks or the like (not shown), and a drain valve DV terminating in a hose coupling connection 5 to which the hose H-2 of the servicer unit 6 (to the left of the dot-dash line) is adapted to be connected for a purpose which will hereinafter be explained in detail. Also disposed in the aircraft dewar 1 are three level sensors LS-1, LS-2, and LS-3 respectively indicating that the dewar 1 is empty (e.g., less than 3 gal.), half full (e.g., 19 gal.), and full (e.g., 41 gal.), the level sensor signals being conducted to the electrical coupling EC-1 for coupling to an electric cable 7 which is embodied in the vacuum jacketed fill hose H-1, the latter being connected to the quick disconnect coupling QD-1 when it is desired to fill the aircraft dewar 1 with $LN_2$.

The servicer unit or system 6 for filling the aircraft dewar 1 comprises a supply dewar or tank T-1 which is adapted to be filled with $LN_2$ through a fill line 8 having a coupling C-1 and a tank fill valve V-1. The tank T-1 is provided with a liquid level gauge LL-1 and by way of example, the tank T-1 may have a capacity of 105 gallons of $LN_2$ which may be stored therein at a saturated vapor pressure of say 15 psi or less. The fill line 8 has a branch line 9 connected thereto in which is disposed a valve V-2 and a relief valve RV-2 which may be set to relieve at any pressure in excess of 15 psi and the outlet of said valve RV-2 is communicated with a vent line 10 which in the case of a self-propelled system, leads into the muffler 11 of a pickup truck or the like whereby the relieved $GN_2$ is heated to a temperature exceeding the ambient dew point temperature so that no vapor clouds will be visible when the thus heated $GN_2$ is discharged into the atmosphere from the muffler 11 drain. The branch line 9 also has therein a pressure switch PS-2.

Yet another branch line 12 has a tank relief regulator valve RV-1 therein set at a pressure of say, 125 psi and having its outfall side connected to the vent line 10 and, again, the vented $GN_2$ is heated in the muffler 11 to prevent formation of vapor clouds.

The tank T-1 has an $LN_2$ outlet line 14 having a valve V-6 therein, a mixing unit in the form of an ejector section ES-1, a solenoid operated fill valve SV-1 and a strainer ST-1, the outlet end of said outlet line 14 having connected thereto the vacuum jacketed hose H-1 which is adapted to be coupled at QD-1 to the fill line 2 of the aircraft dewar 1.

A pressure buildup line 15 containing a heat exchanger HX-2 and a solenoid operated valve SV-3 controlled by the pressure switch PS-2, said pressure buildup line 15 being branched off the outlet line 14 and the fill line 8 so that $LN_2$ that is conducted through HX-2 when the valve SV-3 is opened is vaporized and builds up desired pressure (e.g., 80 psi) in the vapor space in the tank T-1 so as to constitute a pump means to force the $LN_2$ to flow through the outlet line 14 and hose H-1 into the aircraft dewar 1 when the fill valve SV-1 is open. Branched off the outlet line 14 and returning to the ejector section ES-1 via a heat exchanger coil HX-1 in muffler 11, and a temperature control TCV-1 having a temperature probe TP-1 responsive to temperature in the outlet line 14 downstream of the ejector section ES-1 thus to modulate the valve TCV-1 so that the $LN_2$ mixture coming out of ES-1 has a predetermined vapor pressure. In lieu of the temperature probe TP-1 and the valve TCV-1, the final pressure of $LN_2$ in the aircraft dewar 1 may be controlled by pressure switches PS and PS-3 as hereinafter described. A branch line 16 between fill valve SV-1 and fill hose H-1 contains the solenoid operated vent valve SV-2 and has therein an orifice vent OR-1, and a check valve CV-1 having its outlet side connected to the vent line 10 for flow of vented $GN_2$ through the muffler 11 for the purpose previously mentioned. The pressure switches PS-1 and PS-3 in branch line 16 are normally closed and may be set to open at pressures of say 15 psi and 35 psi respectively. The branch line 16, upstream of the vent valve SV-2, has a relief valve RV-3 which may be set to open, at say, a pressure exceeding 100 psi to relieve excess pressure to the vent line 10.

Another branch line 17 from outlet line 14 to the downstream side of the heat exchanger HX-1 has a valve V-5 therein and a relief valve RV-4 which also may be set at a pressure of 100 psi to relieve excess pressure into the vent line 10. Said branch line 17 also has an aircraft purge valve V-4 with a coupling C-2 to which the hose H-2 may be coupled instead of to the coupling C-3 as shown in FIG. 1, the line 18 containing the coupling C-3 having a valve V-3 therein of which the downstream side is connected to the vent line 10.

Figure 2:
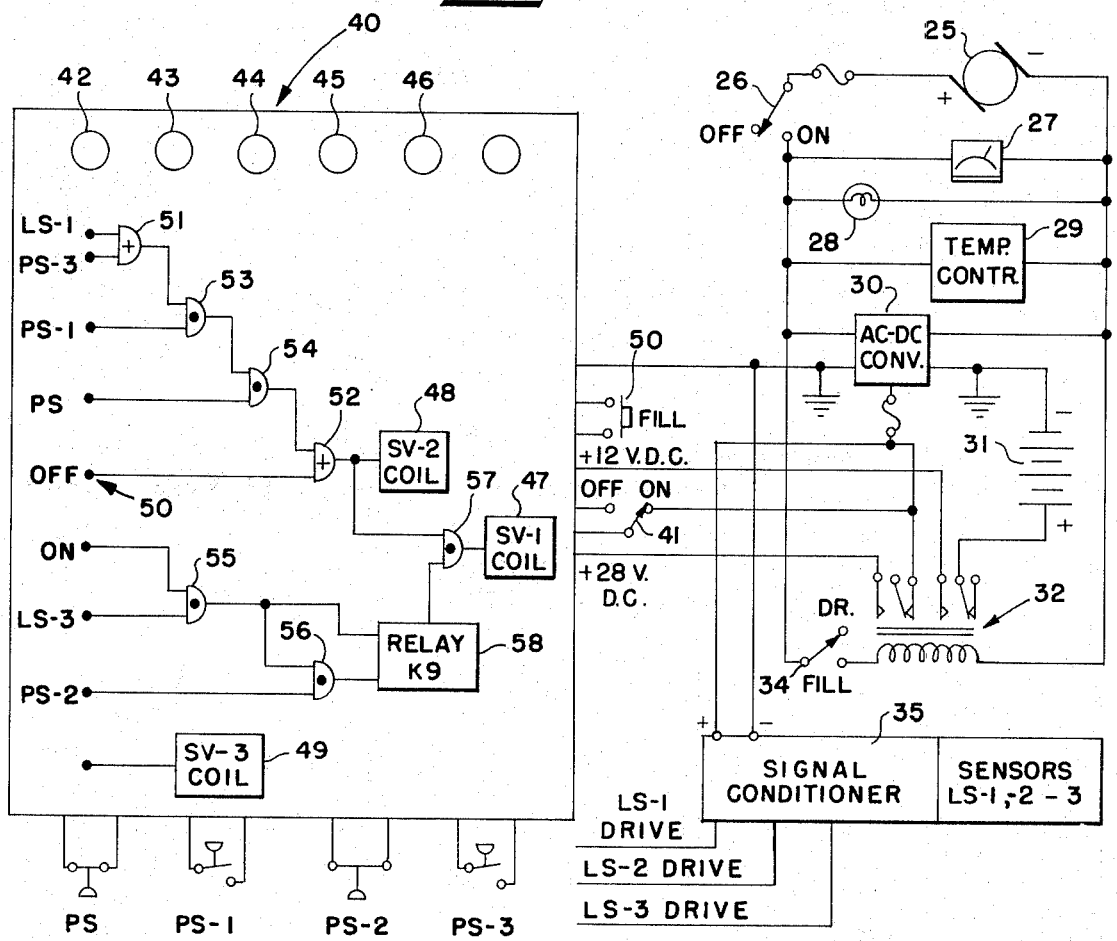
FIG. 2 is an electrical schematic diagram showing the electric power supply to the fill control logic unit of the system.

Having thus described the fluid control components of the present system as shown in FIG. 1, reference will now be made to FIG. 2, wherein the $LN_2$ and $GN_2$ control system 6 is embodied as in a pickup truck (not shown) having an AC generator 25, a main power switch 26, an AC volt meter 27, an AC power on indicating light 28, a truck temperature controller 29, a 28 V DC 28 AC/DC converter 30, a 12 V DC battery 31, and a 115 V AC relay 32, the coil of which has in circuit therewith a drain and fill switch 34 for energizing and de-energizing said coil.

The mobile unit or truck therefore provides the electrical output to the fill control logic unit 40 which includes a 28 V DC power line, a 12 V DC solenoid power line, another 28 V DC power line which contains a purge on-off switch 41. The lines labeled "LS-1 Drive," "LS-2 Drive," and "LS-3 Drive" lead to the logic unit 40 from the respective level sensors LS-1, LS-2 and LS-3 in the aircraft dewar 1 via a signal conditioner 35. The fill control logic unit 40 has indicators in the form of lights 42 to 46 respectively denoting the level of $LN_2$ in the aircraft dewar 1 as empty, half-full, and full, DC power on, and aircraft dewar 1 not full-over pressure. Also shown in FIG. 2 is the normally closed pressure switch PS which opens at a pressure above 55 psi, the normally open pressure switch PS-1 which closes at a pressure below 15 psi, the normally closed pressure switch PS-2 which opens at a pressure above 80 psi and the normally open pressure switch PS-3 which closes at a pressure below 35 psi. Also shown in FIG. 2 are the solenoids 47, 48, and 49 for the respective solenoid operated valves SV-1, SV-2, and SV-3, which are the fill, vent, and pressure buildup valves as already described. The fill control logic unit 40 also has a push to start filling switch 50.

The logic unit 40 herein preferably is of the RTL type (resistor transistor logic) comprising OR gates 51 and 52 and AND gates 53, 54, 55, 56 and 57 and before referring in detail to the operation of the logic circuit, reference will now be made generally to the conditioning of the ground service unit 6 for performing the aircraft dewar 1 filling operation. First, the servicer unit 6 will be driven to a position adjacent the aircraft and the 28 volt DC power supply will be activated (switch 26 to "ON" and switch 34 to "FILL") as well as the truck safety interlock which may comprise a switching arrangement so designed that the vehicle cannot be driven away from the aircraft. Then the valve V-2 is closed and the $LN_2$ transfer hose H-1 will be connected at QD-1 to the fill line 2 of the aircraft dewar 1, and next, the electrical cable 7 which is integrated into the hose H-1 may be connected to the electrical connector at EC-1 to receive the signals from the level sensors LS-1, LS-2 and LS-3. The hose H-2 is also connected to the hose coupling 5 to permit, if desired, draining of the aircraft dewar 1 by opening the valves DV and V-3, whereby the aircraft dewar 1 may be drained through the vent line 10 with accompanying heating to vaporize the nitrogen and to heat the resulting $GN_2$ in the muffler 11 to a temperature exceeding the ambient dew point temperature thus to avoid cloud formation.

With the main switch 26 in "ON" position, and with the function switch 34 in "FILL" position actuating the relay 32, +12 V DC and +28 V DC power is supplied to the logic unit 40. The valves V-6 and SOV are opened and with the fill switch 50 in "OFF" position the normally open solenoid operated vent valve SV-2 is closed through the OR gate 52 and consequent energization of solenoid 48 and the normally closed solenoid operated fill valve SV-1 remains closed by reason of the lack of outputs from the AND gates 55, 56 and 57. Also at this time the temperature probe TP-1 if employed may be set at desired value, e.g., 50 psi.

To initiate the automatic filling cycle, the button of switch 50 is pushed in to cut off the "OFF" input to the OR gate 52 thus to deenergize the SV-2 coil 48 to permit opening of the normally open solenoid operated vent valve SV-2. The vent valve SV-2 remains open to vent the aircraft dewar 1 through fill line 2, hose H-1, lines 14 and 16, vent orifice OR-1, check valve CV-1 and vent line 10 until the pressure in line 16 either decreases to less than 15 psi (PS-1 closes < 15 psi) when the level sensor LS-1 is not covered and empty indicator light 42 is on or decreases to less than 35 psi (PS-3 closes < 35 psi) when the level sensor LS-1 is covered (light 42 off). Moreover, the pressure switch PS closes at an aircraft dewar pressure less than 55 psi to extinguish the not full over-pressure light 46 whereby the output from the AND gate 54 establishes energization of the SV-2 coil 48 to close the vent valve SV-2.

At the time of actuation of the switches 26 and 34 the pressure switch PS-2 is closed (closes < 80 psi) thus to energize the SV-3 coil 49 which opens the solenoid operated pressure buildup valve SV-3 for flow of $LN_2$ through the heat exchanger HX-2 to vaporize the $LN_2$ to apply pressure on the $LN_2$ in the tank T-1. When such pressure builds up to exceed 80 psi, the pressure switch PS-2 opens to de-energize SV-3 coil 49 to permit closing of valve SV-3 and to provide an output from the AND gate 56 which actuates relay 58 and which, in conjunction with the energization of the SV-2 coil, provides an output from AND gate 57 to energize the SV-1 coil 47 to open the normally closed fill valve SV-1. Accordingly, $LN_2$ flows from T-1 through ejector section ES-1 for mixing with $LN_2$ heated in heat exchanger HX-1 to obtain a mixture having a vapor pressure of 50 psi, through hose H-1, fill line 2, and fill tube 3 into the aircraft dewar 1.

Initially, the $LN_2$ may be vaporized by residual heat in the outlet piping 14 and H-1 and fill line 2 and in the aircraft dewar 1 and therefore the pressure may build up to exceed 55 psi which will open pressure switch PS with resulting de-energization of the SV-2 coil 48 and opening of the vent valve SV-2 and de-energization of the SV-1 coil 47 and closing of the fill valve SV-1. Opening of the pressure switch PS turns on the not full overpressure indicator light 46. The pressure is decreased as determined by PS-1 or PS-3 as already described in detail. Then the vent and fill valves SV-2 and SV-1 are closed and opened respectively to continue the filling operation. If the level of the $LN_2$ in the aircraft dewar 1 was below level sensor LS-1, the light 42 will be on until that level is reached. When the level reaches level sensor LS-2 the one-half full indicator light 43 will be turned off by the LS-2 signal. When the level reaches the level sensor LS-3, the full indicator light 44 will be turned on and the holding contact circuit closed by the push button switch 50 will be opened to de-energize the SV-1 coil for closing of the fill valve SV-1 to place the switch 50 in the original "OFF" mode to energize the SV-2 coil 48 to close the vent valve SV-2.

Having thus filled the aircraft dewar 1 with $LN_2$ at desired vapor pressure the shut off valve SOV may be closed and the switch 34 actuated to drain "DR" position to de-energize relay 32 to cut off the lower +28 VDC power (light 45 turned off) and to cut off the +12 VDC solenoid power whereby the deenergized SV-2 coil 48 permits opening of the vent valve SV-2 for draining of the hose H-1 and outlet line 14 through line 16, SV-2, OR-1, CV-1, and vent line 10. The hose H-1 may then be detached at QD-1, and the electric cable 7 may be disconnected from EC-1.

If it be desired to purge the aircraft dewar 1 with hot $GN_2$ before performing the filling operation just described, the function switch 34 is left in the "FILL" position whereby the vent and fill valves SV-2 and SV-1 are both closed, and the purge switch 41 is moved to "ON" position so that pressure switch PS-2 will control the pressure buildup valve SV-3 to establish an 80 psi vapor pressure on the $LN_2$ in tank T-1. When the fill hose H-1 is to be used for purging, valve V-5 is opened to conduct hot $GN_2$ from heat exchanger HX-1 through the branch line 17 into hose H-1 and if the outlet valve OV is open, the hot $GN_2$ will purge the aircraft inerting system. If only the aircraft dewar 1 is to be purged, the valves DV and V-3 are opened for venting of the purging fluid into the vent line 10.

Purging of the aircraft system may also be effected by opening valve V-4 (valve V-5 closed) and connecting coupling C-2 to the hose H-2 whereby hot $GN_2$ from the heat exchanger HX-1 passes through the aircraft system when the valves DV and OV are open.

The electronic system herein is designed for failsafe operation and incorporates check-out circuitry to permit testing without affecting normal operation.

We, therefore, particularly point out and distinctly claim as our invention:

1. A system for transferring liquid nitrogen from a supply dewar into a receiving dewar comprising fill conduit means having a fill valve therein through which such liquid is conducted from said supply dewar into said receiving dewar; vent conduit means having a vent valve therein through which said receiving dewar is vented to decrease the vapor pressure of the liquid therein; valve operating means responsive to predetermined vapor pressure of the liquid in said receiving dewar to close said fill valve and to open said vent valve thus to decrease such vapor pressure and further responsive to predetermined decreased vapor pressure of the liquid in said receiving dewar to close said vent valve and to open said fill valve to re-establish flow of liquid from said supply dewar into said receiving dewar.

2. The system of claim 1 wherein said vent conduit means has heating means associated therewith effective to heat the vented vapor to prevent cloud formation upon release to the atmosphere.

3. The system of claim 1 wherein heating means associated with said fill conduit means increases the vapor pressure of the liquid to approximately such predetermined pressure whereby after removal of residual heat in said fill conduit, in said receiving dewar, and in residual liquid therein at the commencement of the transfer operation, the receiving dewar may be filled substantially continuously without alternate opening and closing of said fill and vent valves.

4. The system of claim 1 wherein said system has pump means effective to cause flow of liquid through said fill conduit means from said supply dewar into said receiving dewar.

5. The system of claim 4 wherein said pump means comprises pressure buildup conduit means communicating at its opposite ends with the liquid in said supply dewar and with the vapor space thereof and having heating means associated therewith to vaporize the liquid as it flows through said pressure buildup conduit means into such vapor space whereby increased vapor pressure in said supply dewar exceeding such predetermined vapor pressure forces liquid flow through said fill conduit means into said receiving dewar.

6. The system of claim 5 wherein said pressure buildup conduit means has a solenoid operated valve therein; and wherein a pressure switch responsive to such increased vapor pressure in said supply dewar closes said solenoid operated valve, the latter being cooperatively connected to said valve operating means so that said fill valve can be opened only when said solenoid operated valve is closed.

7. The system of claim 1 wherein said fill and vent valves are respectively normally closed and normally open solenoid operated valves; and wherein said valve operating means comprises a pressure switch which de-energizes the solenoids of said valves at such predetermined vapor pressure.

8. The system of claim 7 wherein another pressure switch energizes the solenoids of said valves at such pre-determined decreased vapor pressure.

9. A system for transferring liquid nitrogen from a supply dewar into a receiving dewar comprising conduit means between said dewars having valve means therein through which liquid is conducted from said supply dewar into said receiving dewar and through which said receiving dewar is vented to decrease the vapor pressure of the liquid therein when such pressure exceeds a predetermined value; and valve operating means responsive to such predetermined vapor pressure to operate said valve means to close communication between said dewars and to vent said receiving dewar to the atmosphere and further responsive to pre-determined decreased vapor pressure of the liquid in said receiving dewar to open communication between said dewars and to close communication of said receiving dewar with the atmosphere.

10. The system of claim 9 wherein said receiving dewar has level sensing means therein effective, upon filling of said receiving dewar to predetermined level, to operate said valve means independently of said valve operating means to close communication between said receiving dewar and said supply dewar.

11. The system of claim 9 wherein said supply dewar has pressure buildup means associated therewith to cause flow of liquid through said conduit means and valve means into said receiving dewar; and wherein said conduit means has heating means effective to increase the vapor pressure to approximately such predetermined value.

12. The system of claim 9 wherein said conduit means has heating means effective to heat the vented vapor to prevent cloud formation upon release to the atmosphere.

13. The system of claim 12 wherein said receiving dewar has a valved drain line through which said receiving dewar may be drained by venting through said conduit means and heating means.

14. The system of claim 12 wherein said heating means comprises an exhaust muffler of a self-propelled vehicle having said supply dewar and said conduit means adapted to be detachably coupled to said receiving dewar.

15. A system for transferring liquid nitrogen from a supply dewar into a receiving dewar comprising conduit means between said dewars having valve means therein through which liquid is conducted from said supply dewar into said receiving dewar and through which said receiving dewar is vented to decrease the vapor pressure of the liquid therein when such pressure exceeds a predetermined value; and valve operating means responsive to such predetermined vapor pressure to operate said valve means to close communication between said dewars and to vent said receiving dewar to the atmosphere and further responsive to pre-determined decreased vapor pressure of the liquid in said receiving dewar to open communication between said dewars and to close communication of said receiving dewar with the atmosphere; said valve operating means comprising first and second pressure sensing means respectively disposed between said valve means and said receiving dewar and downstream of said valve means.

16. The system of claim 15 wherein orifice means downstream of said second pressure sensing means and said valve means effects buildup of pressure to such predetermined decreased vapor pressure when said receiving dewar is communicated with the atmosphere via said valve means and orifice means and exposes said second pressure sensing means to atmospheric pressure when said valve means opens communication between said dewars.

17. The system of claim 16 wherein said receiving dewar has a low level sensing means; and wherein said valve operating means additionally comprises a third pressure sensing means downstream of said valve means operative when the liquid level in said receiving dewar is below said low level sensing means to operate said valve means to oepn communication between said dewars and to close communication of said receiving dewar with the atmosphere when the decreased vapor pressure is less than that to which said second pressure sensing means responds.

18. A system for transferring liquid nitrogen from a supply dewar into a receiving dewar comprising conduit means between said dewars having valve means therein through which liquid is conducted from said supply dewar into said receiving dewar and through which said receiving dewar is vented to decrease the vapor pressure of the liquid therein when such pressure exceeds a predetermined value; and valve operating means responsive to such predetermined vapor pressure to operate said valve means to close communication between said dewars and to vent said receiving dewar to the atmosphere and further responsive to predetermined decrease vapor pressure of the liquid in said receiving dewar to open communication between said dewars and to close communication of said receiving dewar with the atmosphere; said supply dewar having pressure buildup means associated therewith to cause flow of liquid through said conduit means and valve means into said receiving dewar; said conduit means having heating means effective to increase the vapor pressure to approximately such predetermined value; said heating means comprising a heat exchanger branched off said conduit means to heat a portion of the liquid flowing in said conduit means and to mix it with the remaining portion of the flowing liquid.

19. The system of claim 18 wherein said system has a valved purge line to conduct liquid heated by said heat exchanger to said receiving dewar while said valve means closes communication between said dewars and closes communication of the receiving dewar with the atmosphere.

20. The system of claim 19 wherein said receiving dewar has a valved drain line through which the heated liquid in said purge line is adapted to be conducted into said receiving dewar.

21. A system for filling an aircraft dewar with a cryogenic liquid such as $LN_2$ comprising a supply dewar containing $LN_2$; conduit means through which $LN_2$ is conducted from said supply dewar into said aircraft dewar; heating means to increase the vapor pressure of the $LN_2$ flowing through said conduit means into said aircraft dewar; a fill valve in said conduit means through which $LN_2$ flows from said supply dewar into said aircraft dewar when said fill valve is open; pump means operative to force said $LN_2$ to flow through said conduit means into said aircraft dewar when said fill valve is open; a vent valve in said system downstream of said fill valve operative to vent $GN_2$ from said aircraft dewar; heating means operative to heat the vented $GN_2$ to substantially ambient dew point temperature to preclude vapor cloud formation; and valve operating means responsive to increase of vapor pressure in said aircraft dewar to a predetermined maximum to close said fill valve and to open said vent valve and in response to decrease of such vapor pressure to a predetermined minimum to close said vent valve and to open said fill valve.

22. The system of claim 19 wherein said pump means comprises a heat exchanger operative to vaporize a portion of the $LN_2$ in said supply dewar and to conduct $GN_2$ therefrom into the vapor space of said supply dewar thus to apply pressure on the $LN_2$ therein to cause the same to flow through said conduit means into said aircraft dewar via said fill valve when the latter is open.

23. The system of claim 21 wherein said aircraft dewar has a valved drain conduit means through which said aircraft dewar may be drained vai said heating means.

24. The system of claim 21 wherein said fill valve is normally closed and wherein said vent valve is normally open; wherein said aircraft dewar has a level sensor therein denoting the full condition thereof and operative to actuate said valve operating means to an inactive position wherein said fill valve is in its normally closed position and said vent valve is in its normally open position; and wherein said conduit means adjacent said aircraft dewar has a shut-off valve therein whereby upon closing of said shut-off valve the portion of said conduit means downstream of said fill valve may be drained by venting through said vent valve as aforesaid.

25. The system of claim 21 wherein said system is embodied in a self-propelled vehicle of the internal combustion engine type having said conduit means adapted to be coupled to a fill line of the aircraft dewar, a portion of said conduit means being disposed in the muffler of said vehicle to constitute said heating means; wherein a branch conduit extends through said muffler to constitute a heat exchanger to heat a portion of the $LN_2$ flowing in said conduit means; and wherein mixing means in said conduit means mixes heated $LN_2$ in said branch conduit with $LN_2$ from said supply dewar to provide a mixture of higher vapor pressure than the vapor pressure of the $LN_2$ in said supply dewar.

26. The system of claim 25 wherein another branch conduit leading from the downstream side of said heat exchanger means to the portion of said conduit means which is downstream of said fill valve whereby said aircraft dewar and/or aircraft inerting system may be purged with heated $GN_2$ upon opening of a valve in said another branch conduit while both said fill and vent valves are in closed position.

27. A system for transferring liquid nitrogen from a supply dewar into a receiving dewar comprising fill conduit means having a fill valve therein through which such liquid is conducted from said supply dewar into said receiving dewar; vent conduit means branched from said fill conduit means downstream of said fill valve; said vent conduit means having a vent valve therein through which said receiving dewar is vented to decrease the vapor pressure of the liquid therein; valve operating means responsive to predetermined vapor pressure of the liquid in said receiving dewar to close said fill valve and to open said vent valve thus to decrease such vapor pressure and further responsive to predetermined decreased vapor pressure of the liquid in said receiving dewar to close said vent valve and to open said fill valve to re-establish flow of liquid from said supply dewar into said receiving dewar.

* * * * *